United States Patent [19]

Mende

[11] 4,297,791
[45] Nov. 3, 1981

[54] HOSE WATER LEVELING INSTRUMENT

[76] Inventor: Ernst W. Mende, Akazienhain 13, 518 Eschweiler, Fed. Rep. of Germany

[21] Appl. No.: 91,407

[22] Filed: Nov. 5, 1979

Related U.S. Application Data

[63] Continuation of Ser. No. 897,385, Apr. 18, 1978, abandoned.

[30] Foreign Application Priority Data

Apr. 19, 1977 [DE] Fed. Rep. of Germany ....... 2717347

[51] Int. Cl.³ .......................... G01C 9/22; G01C 5/04
[52] U.S. Cl. ..................................... 33/367; 251/247; 137/45
[58] Field of Search .......................... 33/367; 251/247; 137/45

[56] References Cited

U.S. PATENT DOCUMENTS

| 2,082,723 | 6/1937 | Seward | 137/45 |
| 2,304,625 | 12/1942 | Carlson | 33/347 X |
| 2,351,177 | 6/1944 | Younkman | 137/45 |
| 2,664,645 | 1/1954 | Qualman | 33/367 |
| 3,443,319 | 5/1969 | Dooley | 33/367 X |
| 3,651,581 | 3/1972 | Lehman | 33/367 |
| 3,766,657 | 10/1972 | Hopkins | 33/371 X |
| 3,816,947 | 6/1974 | Taylor | 33/367 X |
| 3,849,898 | 11/1974 | Turloff | 33/367 |

Primary Examiner—Charles E. Phillips
Attorney, Agent, or Firm—Max Fogiel

[57] ABSTRACT

A hose water leveling instrument in which a thin hose is filled with liquid and has an end to which a fixable reference instrument is connected. Another end of this hose has connected to it a freely-movable reading instrument. The housing of the reference instrument has on its rear side, a mounting surface with adhesive characteristics. A contacting section next to this mounting surface has a measuring scale which is easily read from different directions. An automatically opening and closing venting valve prevents run out of this measuring liquid, and is located in the reference instrument which is permanently filled with measuring liquid. The venting valve is in the form of a plane-convex body located in a valve chamber. The body on its plane surface facing a valve chamber wall, has a lever which, in a horizontal position of the reference instrument forces a ball-shaped closure body against a valve seat of a venting aperture when the plane-convex body, due to the weight of the lever is pivoted about a fulcrum on the periphery of the body.

5 Claims, 6 Drawing Figures

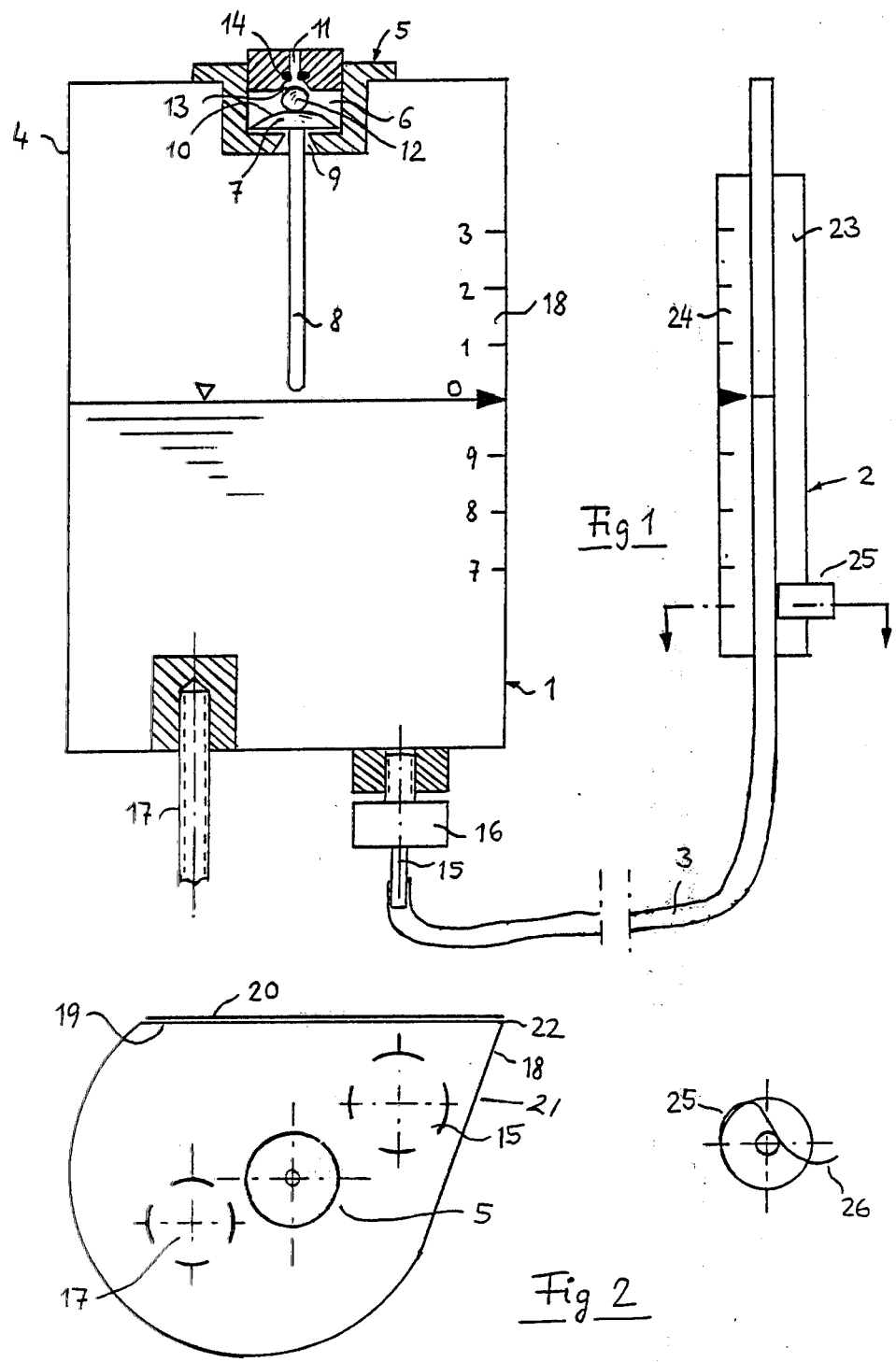

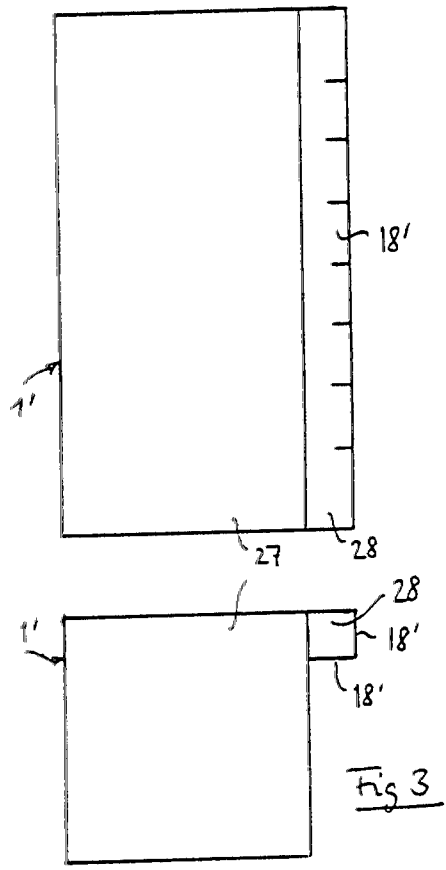
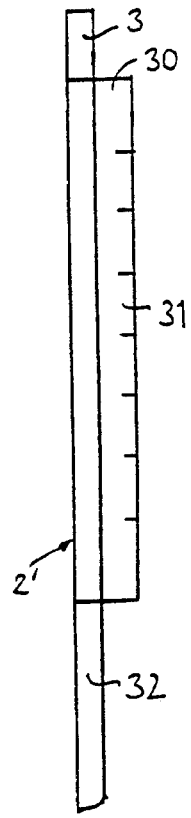
Fig. 3
Fig. 4
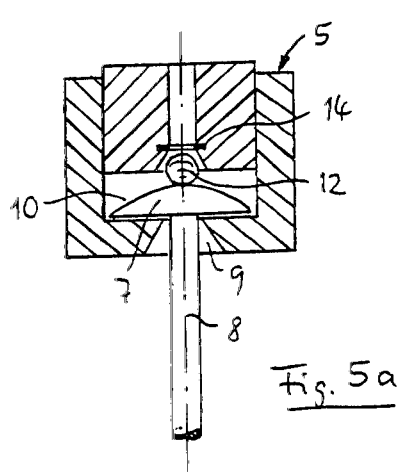
Fig. 5a
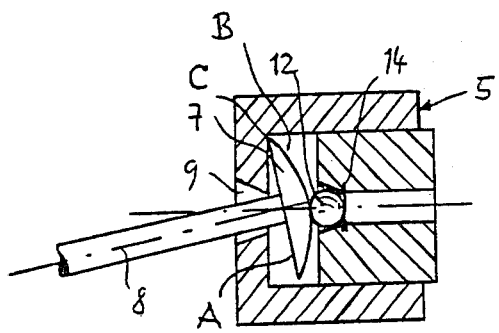
Fig. 5b

HOSE WATER LEVELING INSTRUMENT

BACKGROUND OF THE INVENTION

This is a continuation of application Ser. No. 897,385, filed Apr. 18, 1978, now abandoned.

The present invention relates to hose water leveling, instruments which are widely used as relatively simple and yet precise instruments for leveling floors, ceilings, suspended ceilings, platforms, etc. They operate on the principle of communicating tubes. To prepare for measuring, the connecting hose is connected on one end to the reference instrument and on the other end to the reading instrument, and then the entire system is filled with a measuring liquid, for example, water. Filling the system requires considerable time, as does the removal of air bubbles from the hose. The installation and fastening of the reference instrument at the reference level also is time-consuming.

It is, therefore, the object of the present invention to provide a hose water leveling instrument which is simple and uncomplicated in design and handling, and is ready for immediate use without extensive measuring preparations, and whose reference instrument can be attached quickly, safely and yet precisely, and can also be removed quickly, and its level can be easily read from several sides.

SUMMARY OF THE INVENTION

The easy attachment of the reference instrument to the wall and simultaneously to the reference level is easily achieved in accordance with the invention by providing the housing of the reference instrument on its rearside with a plane mounting surface, preferably an adhesive surface, and with a contacting section which is next to this mounting surface. A measuring scale which can be easily read from various directions is provided.

In accordance with a specific embodiment of the present invention, the adhesive surface on the rearside of the reference instrument is obtained by placing on the mounting surface a double-sided adhesive strip or velcro strip which permits easy fastening to a wall. The mounting surface of the reference instrument may also be provided with suction cups. The reference instrument has a cross-section composed of a semicircular area and a triangular area bounding the semicircle diameter; it may also be composed of a larger and a smaller rectangular area, particularly squares. The diameter of the cylindrical bodies with these cross-sections is preferably of such a size that this cylindrical body can be conveniently held by hand.

The time-consuming filling of the hose water leveling instrument is avoided by the present invention because the reference instrument remains continuously filled with the measuring liquid. Venting of the reference instrument is provided by a venting valve which in the vertical position of the reference instrument, corresponding to the measuring position, is automatically in the open position. With the reference instrument greatly inclined or horizontal, during removal or transport, it closes automatically and thus prevents the measuring liquid from running out of the reference instrument. The venting valve in accordance with the present invention comprises a plane-convex body with an attached lever, and a closure body which can be pressed by this plane-convex body against a venting aperture.

Another advantageous embodiment of the present invention is the fact that the housing of the reference instrument is made either entirely or partially transparent to show the level of the measuring fluid.

In order to handle all possible fastening problems, a multiple fastening device is located on the storage tank in accordance with the present invention.

Another advantageous embodiment of the present invention is the provision of the reference instrument with a hose connection adapter with a valve which closes automatically when the hose is removed, a so-called self-closing valve. The associated hose end has a similar self-closing valve so that neither the hose nor the reference instrument lose any measuring fluid when the hose is removed. When the hose is re-attached, the hose water leveling instrument is ready to measure at once, without having to be refilled with measuring fluid or without requiring removal of air bubbles from the hose.

The other end of the hose with the reading instrument is also secured against unintentional run-out of measuring liquid. In the most simple case, there is provided a float valve, already known in the art, where the floating body closes the air aperture when the water column rises. The reading instrument, in accordance with a preferred embodiment of the present invention, comprises the end portion of the hose and a precisely seated and transparent cover tube which is slid over the hose and is movable in the longitudinal direction of the hose. This cover tube has a scale graduation. The cover tube can be fixed to the hose by a spring clip which is lifted during displacement with the thumb, i.e., is loosened. Another possibility for a simple reading instrument is to squeeze the end portion of the hose into a U-profile or the like in such a way that it is still barely displaceable; a leg of this U-profile is widened and mounts the measuring scale. This U-profile forms the upper end of the marking bar which rests against the floor when a floor is being leveled.

The invention will now be described in an embodiment in connection with the accompanying drawings showing therein:

BRIEF DESCRIPTION OF THE DRAWINGS

FIG. 1 shows a side view of the hose water leveling instrument, with the fittings shown as sections;

FIG. 2 shows a top view of the hose water leveling instrument in accordance with FIG. 1;

FIG. 3 shows another housing embodiment of the reference instrument;

FIG. 4 shows a side view of another reading instrument; and

FIGS. 5a, 5b show the operation of the venting valve in the vertical and horizontal positions.

DESCRIPTION OF THE PREFERRED EMBODIMENTS

The hose water leveling instrument according to FIG. 1 comprises a transparent reference instrument 1, a transparent reading instrument 2 and a connecting house 3. The cover of housing 4 of the reference instrument 1 contains a venting valve 5 which can be removed for the filling with measuring liquid. The inside 6 of this venting valve 5 holds a plane-convex body 7 to whose underside a lever 8 is attached to provide weight. The hole 9 through which lever 8 protrudes is expanded conically towards the outside (downward), making possible unimpeded tilting of the lever. Between the convex topside 10 of body 7 and a downwardly expanding venting aperture 11 is a ball-shaped closure body 12.

This expanded portion of the venting aperture 11 forms the valve seat 13 against which the closure body 12 is pressed during the closed position of venting valve 5. Also, a sealing ring 14 is provided at the valve seat 13. At its bottom side, the reference instrument 1 has a hose connection adapter 15 with a valve 1 which automatically closes when hose 3 is removed, and a support bar 17 in the form of a threaded bar. A measuring scale 18 is located on the side of the reference instrument 1.

Referring to the top view of FIG. 2, the reference instrument 1 has a cross-section composed of a semicircle and a triangle. The rear wall 19 of the reference instrument is a plane surface and has a two-side adhesive strip 20 by means of which it can be fastened simply, quickly and safely to any wall, including rough ones, and accurately to the reference level. This reference instrument with the semicircular cross-section can be easily grasped by hand. The right-hand side 21, making an angle with the rear wall 19, mounts the measuring scale 18 which can be easily read from the front and from the side. Through the eccentric location of the support bar 17 and of the hose connection adapter 15, the reference instrument, in those cases where it is mounted on the support bar 17, can be easily grasped, when the marking edge 22 is moved to the level mark on the wall, by the hose connection adapter 15 and can be guided easily by means of this connection adapter.

The reading instrument 2 comprises the end section of hose 3 and a transparent cover 23 tube slid over it with a measuring scale 24. Hose 3 must be transparent at least in its end section. To clamp the cover tube to a certain point on hose 3, there is a spring clip 25 whose bow-like end 26 during shifting of the cover tube 23 is pressed outward with the thumb (FIG. 2).

FIG. 3 shows a side view and a top view of reference instrument 1' comprising a cylinder 27 of square cross-section. The measuring scale 18' is located on both side walls of a smaller cylinder 28 of square cross-section; this smaller cylinder is attached to cylinder 27 and is connected to it by a connecting hole. This reference instrument is just as convenient and can be produced simply from tubes of square cross-section.

FIG. 4 shows side view and top view of another very simple reading instrument 2' where the end portion of the transparent hose 3 is clamped into a U-profile 29 whose one leg 30 is longer and mounts a measuring scale 31. The U-profile 29 is extended downward to form marking edge 32.

Finally, FIGS. 5a, 5b show the venting valve in its opened vertical position during measurement and in its closed horizontal position during transport. In the vertical position, the closure body 12, because of its weight, drops downward and frees the venting aperture 11. This vertical position has already been described in detail in connection with FIG. 1. For example, when the reference instrument during removal from the wall or during transport is placed in a horizontal position, the weight of the lever 8 moves the plane-convex body 7 about a fulcrum C lying on the periphery of the plane-convex body 8 in such a way that its plane surface A detaches from the valve chamber wall 33 and presses closure body 12 into the conical valve seat 13 by means of its convex surface B against a sealing ring 14 so that the venting aperture 11 is closed and no measuring fluid can run out. The plane-convex body 7 is made of magnetic material so that it attracts the closure body made of ferrous material when the reference instrument 1 is placed in its vertical position and the venting valve 5 is reliably opened again.

The inexpensive embodiment of a hose water leveling instrument is particularly well suited for small tradesmen, hobbyists and home workshops.

I claim:

1. A hose water leveling instrument, comprising a liquid-filled hose; a fixable reference instrument, permanently filled with measuring liquid and connected to one end of said hose; a freely movable reading instrument connected to the other end of said hose; said hose connecting said reference instrument to said reading instrument; said reference instrument having a fully transparent housing for displaying the level of said measuring liquid, said housing having a plane rear side for directly contacting a mounting wall with a reference level to be transmitted, said transparent housing having a measuring scale section located next to said plane rear side and being readable from different directions, said housing having a substantially slender cylindrical shape with uniform diameter and a cross-section comprised of a substantially semi-circular area and a triangular area bounding the diameter of said semi-circular area, said diameter having a magnitude so that said housing can be easily grasped and enclosed by hand; and a single automatically opening and closing venting valve for preventing run out of said liquid and being located in said reference instrument; a valve chamber with a wall, said venting valve comprising a plane-convex body located in said valve chamber, said body on its plane surface facing said valve chamber wall and having a lever loaded with weight; said lever having a convex surface located inside said valve chamber; a ball-shaped closure member; venting aperture means with a conical valve seat; said lever in horizontal position of said reference instrument forcing said ball-shaped closure member against said valve seat and forming a linear seal when said plane-convex body due to the weight of said lever is pivoted about a fulcrum on the periphery of said plane-convex body so that a dust particle will be forced out of the contact surface between said closure member and said valve seat, said plane-convex body hanging vertically in a vertical position of said reference instrument to the weight of said body and said lever, the plane surface of said body being in full contact with said valve chamber wall without exerting force on said closure member, said closure member dropping out of said venting aperture means due to the weight of said closure member; at least said plane-convex body being comprised of magnetic material, said closure member being comprised of ferrous material.

2. A hose water leveling instrument as defined in claim 1 wherein said reference instrument has a hose connection adapter with a valve automatically closing upon removal of said hose.

3. A hose water leveling instrument as defined in claim 1 including a double-sided adhesive strip on said mounting surface for fastening said reference instrument to a wall of a building.

4. A hose water leveling instrument as defined in claim 1 wherein said mounting surface of said reference instrument has suction means.

5. A hose water leveling instrument, comprising a liquid-filled hose; a fixable reference instrument, permanently filled with measuring liquid and connected to one end of said hose; a freely movable reading instrument connected to the other end of said hose; said hose connecting said reference instrument to said reading instrument; said reference instrument having a fully transparent housing for displaying the level of said measuring liquid, said housing having a plane rear side for directly contacting a mounting wall with a reference level to be transmitted, said transparent housing having a measuring scale section located next to said plane rear side and being readable from different directions, said housing having a substantially slender cylindrical shape with uniform diameter and a cross-section comprised of a substantially semi-circular area and a triangular area bounding the diameter of said semi-circular area, said diameter having a magnitude so that said housing can be easily grasped and enclosed by hand; and a single automatically opening and closing venting valve for preventing run out of said liquid and being located in said reference instrument; a valve chamber with a plane bottom wall, said venting valve comprising a plane-convex body located in said valve chamber, said body on its plane surface facing said valve chamber wall and having a lever loaded with weight; said lever having a convex surface located inside said valve chamber; a ball-shaped closure member; venting aperture means with a valve seat; said lever in horizontal position of said reference instrument forcing said ball-shaped closure member against said valve seat when said plane-convex body due to the weight of said lever is pivoted about a fulcrum on the periphery of said plane-convex body, said plane-convex body hanging vertically in a vertical position of said reference instrument to the weight of said body and said lever, the plane surface of said body being in full contact with said plane valve chamber wall without exerting force on said closure member, said closure member dropping out of said venting aperture means due to the weight of said closure member; at least said plane convex body being comprised of magnetic material, said closure member being comprised of ferrous material; said reference-instrument housing being transparent for displaying the level of said measuring liquid; said reference instrument having a hose connection adapter with a valve automatically closing upon removal of said hose; and a double-sided adhesive strip on said plane mounting surface for fastening said reference instrument to a wall of a building.

* * * * *